US008510646B1

(12) United States Patent
Young et al.

(10) Patent No.: US 8,510,646 B1
(45) Date of Patent: Aug. 13, 2013

(54) METHOD AND SYSTEM FOR CONTEXTUALLY PLACED CHAT-LIKE ANNOTATIONS

(75) Inventors: David S. Young, San Francisco, CA (US); Andrea Knight, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1145 days.

(21) Appl. No.: 12/166,017

(22) Filed: Jul. 1, 2008

(51) Int. Cl.
*G06F 17/00* (2006.01)

(52) U.S. Cl.
USPC ............ 715/230; 715/231; 715/232; 715/275

(58) Field of Classification Search
USPC .................................................. 715/230–233
See application file for complete search history.

(56) References Cited

U.S. PATENT DOCUMENTS

| | | | | |
|---|---|---|---|---|
| 5,146,552 A * | 9/1992 | Cassorla et al. | ............. | 715/234 |
| 6,332,148 B1 * | 12/2001 | Paine et al. | ................... | 715/236 |
| 6,438,564 B1 * | 8/2002 | Morton et al. | ................ | 715/206 |
| 6,865,713 B1 * | 3/2005 | Bates et al. | ................... | 715/233 |
| 7,409,633 B2 * | 8/2008 | Lerner et al. | ................... | 715/230 |
| 7,418,656 B1 * | 8/2008 | Petersen | ....................... | 715/230 |
| 7,424,670 B2 * | 9/2008 | Burke et al. | ................... | 715/230 |
| 7,432,938 B1 * | 10/2008 | Reuter et al. | ................... | 345/619 |
| 7,739,255 B2 * | 6/2010 | Hengel et al. | ................... | 707/705 |
| 7,779,347 B2 * | 8/2010 | Christiansen et al. | ........ | 715/230 |
| 7,865,816 B2 * | 1/2011 | Tanaka | ........................ | 715/230 |
| 7,941,444 B2 * | 5/2011 | Cragun et al. | ................ | 707/784 |
| 7,962,853 B2 * | 6/2011 | Bedi et al. | ..................... | 715/751 |
| 8,225,274 B2 * | 7/2012 | Cowtan | ......................... | 717/105 |
| 2004/0201633 A1 * | 10/2004 | Barsness et al. | ............. | 345/864 |
| 2004/0210833 A1 * | 10/2004 | Lerner et al. | ................... | 715/512 |
| 2004/0260594 A1 * | 12/2004 | Maddox, Jr. | ....................... | 705/9 |
| 2004/0260714 A1 * | 12/2004 | Chatterjee et al. | ............ | 707/101 |
| 2005/0160355 A1 * | 7/2005 | Cragun et al. | ................. | 715/512 |
| 2005/0160356 A1 * | 7/2005 | Albornoz et al. | .............. | 715/512 |
| 2005/0160357 A1 * | 7/2005 | Rivette et al. | .................. | 715/512 |
| 2005/0182650 A1 * | 8/2005 | Maddox et al. | ................... | 705/1 |
| 2005/0223315 A1 * | 10/2005 | Shimizu et al. | ................ | 715/512 |
| 2005/0268220 A1 * | 12/2005 | Tanaka | .......................... | 715/512 |
| 2006/0053194 A1 * | 3/2006 | Schneider et al. | ............ | 709/204 |
| 2006/0053365 A1 * | 3/2006 | Hollander et al. | ............ | 715/512 |
| 2006/0101328 A1 * | 5/2006 | Albornoz et al. | .............. | 715/512 |
| 2006/0123348 A1 * | 6/2006 | Ross et al. | ..................... | 715/751 |
| 2006/0282762 A1 * | 12/2006 | Diamond et al. | .............. | 715/511 |
| 2006/0282778 A1 * | 12/2006 | Barsness et al. | ............... | 715/726 |
| 2007/0047008 A1 * | 3/2007 | Graham et al. | ................ | 358/401 |
| 2007/0055926 A1 * | 3/2007 | Christiansen et al. | ......... | 715/512 |
| 2007/0118794 A1 * | 5/2007 | Hollander et al. | ............. | 715/512 |
| 2007/0118795 A1 * | 5/2007 | Noyes et al. | ................... | 715/512 |

(Continued)

*Primary Examiner* — Doug Hutton, Jr.
*Assistant Examiner* — Benjamin Smith
(74) *Attorney, Agent, or Firm* — Ropes & Gray LLP

(57) ABSTRACT

Contextually placed chat-like annotations in an electronic record. Users can input successive time-stamped annotations at a selected location in an electronic record. The annotations are displayed chronologically in a discussion window, which is customizable by color, style, and location. The discussion window styles minimize clutter and distraction, thus providing for more effective review and collaboration. The discussion location is indicated by a discussion point icon, and can be displayed in a window of fixed size with scrolling capability. A user can email the discussion window content to other users and request an alert, notifying the user of successive annotations. An annotation engine can reside on a server and receives user input and performs functionality related to the annotations. The electronic record can reside on the server and is repeatedly updated to reflect current content relating to the electronic record and annotations.

33 Claims, 11 Drawing Sheets

Discussion window in line with text in an electronic record and expanded

(56) References Cited

U.S. PATENT DOCUMENTS

| | | | |
|---|---|---|---|
| 2007/0174762 A1* | 7/2007 | Plant | 715/512 |
| 2007/0250901 A1* | 10/2007 | McIntire et al. | 725/146 |
| 2007/0271502 A1* | 11/2007 | Bedi et al. | 715/512 |
| 2008/0046837 A1* | 2/2008 | Beauchamp et al. | 715/804 |
| 2008/0071827 A1* | 3/2008 | Hengel et al. | 707/104.1 |
| 2008/0168073 A1* | 7/2008 | Siegel et al. | 707/100 |
| 2008/0244374 A1* | 10/2008 | Hattori | 715/202 |
| 2008/0270406 A1* | 10/2008 | Flavin et al. | 707/8 |
| 2008/0301571 A1* | 12/2008 | Herzog | 715/764 |
| 2009/0094329 A1* | 4/2009 | Ambati et al. | 709/204 |
| 2009/0129596 A1* | 5/2009 | Chavez et al. | 380/277 |
| 2009/0249224 A1* | 10/2009 | Davis et al. | 715/753 |
| 2009/0254802 A1* | 10/2009 | Campagna et al. | 715/209 |
| 2009/0254840 A1* | 10/2009 | Churchill et al. | 715/753 |
| 2010/0031135 A1* | 2/2010 | Naghshin et al. | 715/230 |
| 2010/0262659 A1* | 10/2010 | Christiansen et al. | 709/205 |
| 2010/0278453 A1* | 11/2010 | King | 382/321 |
| 2012/0036423 A1* | 2/2012 | Haynes et al. | 715/230 |

* cited by examiner

700

Meeting Notes for 6/22  [Save] [Save & Close] [Discard Changes]

File | Edit | Insert | Revisions                    [Share] [Publish]

Random Questions to Answer
1. Do we allow users to automatically organize everything in their collection?  — Ken (+2) 5/17/07
2. What visual cues to we give that the user is organizing? — Ken (+2) 5/17/07
3. How to resolve the conflicts of organizing?  — Sam 5/17/07
4. What other features are lost while testing?
5. Authentication Saviano (+4) 5/18/07

Saviano: Is this an issue? All student-provided laptops come standard with disc encryption...

Discussion windows in margin of an electronic record

Fig 7

Discussion windows in line with text of an electronic record

Discussion window in line with text in an electronic record and expanded

Mousing over discussion point in electronic record

Discussion window in bubble in electronic record

METHOD AND SYSTEM FOR CONTEXTUALLY PLACED CHAT-LIKE ANNOTATIONS

TECHNICAL FIELD

The invention relates to user annotation of an electronic record. In particular, the invention provides for collaborative, multiple-user discussion relating to the content of an electronic record by providing intuitive functionality and a customizable display of annotations.

BACKGROUND

People working in various environments need to collaborate with others with regard to documents and other electronic records. This is easy to do one-on-one in person but hard to do within a document that many people are working on when these people view it asynchronously and are not collocated.

People miss the tangible simplicity of being to be able to point at content and say what they feel about it, thereby starting an informal discussion with others that will ultimately resolve the matter in question. People reviewing a document want to be able to see at a high level what parts of a document are currently being discussed but do not want these comments, markings and annotations to clutter up the document they are trying to review. People reviewing also want to be able to quickly and efficiently assess what is being discussed.

Conventional comment models fail to provide a balanced way for users to easily accomplish the goals above. Conventional comment models are cumbersome, distract the user, and do not invite the user to provide their own feedback.

For example, MICROSOFT WORD attempts to accomplish this task by pulling aside all the comments into the right margin. This model doesn't scale. These comments quickly pile up adding clutter to the document as they push down the full height of the right margin and add a web of lines that attempt to associate the comment with to which it relates. Further, this comment model does not invite a response from their viewer. The comments are poorly organized and appear as a bunch individual statements that cannot be easily understood/read as a chronological discussion. Comments provide poor attribution to who said what when and in response to whom. MICROSOFT WORD relies on its users to circulate comments to others and keep track of the various comments that are on different copies and versions of a document.

BUZZWORD software provides another document collaboration environment. The system does not scale well either, and comments can easily become unpaired from the content they reference which may no longer be visible alongside the comment. This model does not encourage others to respond or handle discussions between multiple users well. Important information is also placed at the footer of the comment which is difficult to reference or skim in documents with many or long comments.

SUMMARY OF THE INVENTION

The invention described herein can provide methods and systems for collaborative annotation displayed in an intuitive, uncluttered format. The invention provides users with numerous options to enhance the display and functionality of the collaboration process. When a person is ready to approach a topic that is being discussed, the invention allows users to be able to quickly and easily assess the type of topic it is, what part of the document is in question, who has said what, how long the discussion has been going on for and how recently someone has responded.

An embodiment of one aspect of the invention provides a method for annotating electronic records, the annotations entered by users and the method comprising the stages of: generating a discussion window at a location in one of the electronic record; entering into the discussion window successive annotations input by a subset of the users, the successive annotations time-tagged, also known as time-stamped, relative to their time of input by the respective user into the discussion window; and repeatedly updating the discussion window to reflect annotations successively input into the discussion window.

An embodiment of another aspect of the invention provides a system for annotating electronic records based on input of users, the system including: central processing units for executing programs; an interface for receiving input from the users, the interface in communication with the central processing units; and an annotation engine executable by the central processing units. The engine includes: instructions for receiving the input from the users, the input from the users including (i) a selection of a location for a discussion window in one of the electronic records; and (ii) a plurality of successive annotations for insertion into the discussion window; instructions for generating the discussion window at the location in the electronic record; instructions for time-tagging and entering into the discussion window successive annotations input by a subset of the users; and instructions for updating the discussion window, on a repeated basis, to reflect annotations successively input into the discussion window.

An embodiment of yet another aspect of the invention provides a computer program product for use in conjunction with a computer system, the computer program product including a computer readable storage medium and a computer program mechanism embedded therein. The computer program mechanism includes instructions for receiving position information from one or more users, the position information for generating a discussion window at a location in the electronic record. The computer program mechanism can also include instructions for successively receiving into the discussion window additional annotations input by a subset of the users, the successive annotations time-tagged relative to their time of input by the respective user into the discussion window. The computer program mechanism can also include instructions for receiving instructions from at least one of the users, the instructions for electronically communicating at least a subset of the annotations to an identified recipient. The computer program product can also have instructions for launching an email program and sending to the email program a copy of the plurality of annotations, upon receipt of the instructions for electronically communicating a subset of the annotations.

BRIEF DESCRIPTION OF THE DRAWINGS

FIG. 7 is a representative screenshot of discussion windows in the margin of an electronic record, according to one exemplary embodiment.

DETAILED DESCRIPTION OF THE EXEMPLARY EMBODIMENTS

Figure 1:
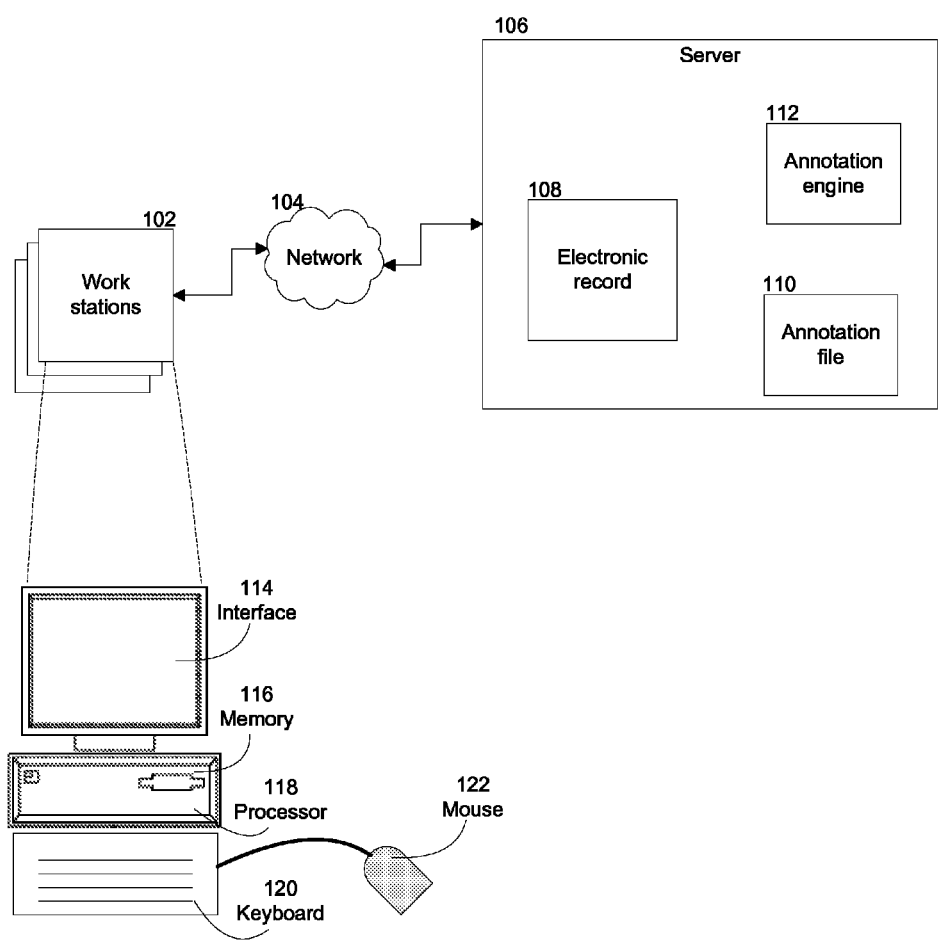
FIG. 1 is a block diagram depicting a system for contextually placed chat-like annotations, according to one exemplary embodiment.

Systems and methods according to the present invention provide for collaborative, multiple-user discussion relating to the content of an electronic record or file, including but without limitation a document, by providing a "chat" like window to display threaded annotations. While viewing the electronic records, such as a document, on a user interface, a user can place a discussion point at a desired location in the document, including the body of the document or the margin, or can do so by highlighting a portion of text, for example. A "discussion point" is used herein to describe the identifying mark, for example, an icon, that visually indicates the location in the document of the discussion, and to what content it applies.

After placing the discussion point, the user can insert an annotation, regarding the surrounding content. "Annotation" is used herein to refer to a comment, note, or instruction added by the user and pertaining to the document. The annotation is displayed on the interface in a discussion window and typically indicates the identification of the person making the annotation, as well as the time. A "discussion window" is used herein to describe the display area of the annotations that correspond to a discussion point, and typically resembles a chat window. The discussion window can be of a fixed height and provide scrolling capability.

Other users can view the same document, either at the same time or at a different time (e.g., via GOOGLE DOCS), and can readily see where annotations have been added, and to which portion of the record they pertain. Open discussions can be indicated by, for example, the discussion point icon. Other users can then add an annotation to the prior users' annotations. After entering the annotation, the new annotation appears in the discussion window, and indicates the identification of the person making the annotation, as well as the time. Thus, multiple users can add to the discussion, by identifying an open discussion and adding to it. In addition, multiple users can add new discussion points. The system thus allows for easy collaboration among multiple users by providing an intuitive snapshot of discussions.

In one aspect, discussions may be set to particular colors to distinguish them, while colors within discussions may be kept monochromatically to the window color to permit advantageous visual screen organization and viewing. In addition, a user can transfer the discussion to an electronic mail program, thereby generating an email message to other users containing content from the discussion window.

Data related to the annotations is stored within the record being reviewed by the various users; in other words, the annotations become part of the record itself. Optionally, a separate file can store the annotations. The file, and/or annotation file are typically located on a web server. Multiple users can access the file over a network. When a user adds an annotation or makes another change, other users currently accessing the file can view the annotation, as within seconds after it is entered. Discussion points are refreshed on a regular, periodic basis referred to as the file's "heartbeat". Users can also view the annotations at a later time by simply viewing the application over the network. Optionally, the system can be implemented locally, such that it need not be accessed over a network. In this way, the file could reside on a user workstation.

Although the electronic records or files may be documents, such as are created by word processors, presentation-creation applications, spreadsheets, and the like, there may in general be other records as well, including photos, videos and even audio files. In addition, discussion points can be added at a point in a two-dimensional space or in a higher-dimensional space (e.g., GOOGLE EARTH or GOOGLE SPACE) represented for the user in 2-space.

The invention can comprise a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow. Further, it will be appreciated to those skilled in the art that one or more of the stages described may be performed by hardware, software, or a combination thereof, as may be embodied in one or more computing systems.

A method and system for providing chat-like annotations will now be described with reference to FIGS. 1-11, which depict representative or illustrative embodiments of the invention.

FIG. 1 is a block diagram depicting a system 100 for contextually placed chat-like annotations, according to one exemplary embodiment. The exemplary system 100 includes one or more workstations 102 in communication with a server 106. The server 106 can include three subcomponents: an electronic record 108; an annotation engine 112; and an annotation file 110. The annotation engine 112 is typically implemented with computer software comprising program code instructions. The annotation engine 112, the electronic record 108, and the annotation file 110 are typically stored in one or more storage media associated with the server 106. Users can interact with the server 106 via a workstation 102. Each workstation 102 can communicate with the server 106 via a network 104, such as the Internet. The workstations 102 also include memory 116; a processor 118; an interface 114; and a keyboard 120 and a mouse 122.

The interface 114 can display the electronic record 108, for viewing by a user. When a user makes an annotation in the electronic record 108, the server 106 can store the annotation in the annotation file 110, and/or in the electronic record 108. In addition, the annotation engine 112 receives user instructions pertaining to the annotations and performs the functionality and options related to the annotations.

The server 106 saves the electronic record on a regular basis, for example, every five seconds. As discussed above, the repeated saving is known as the record's "heartbeat." Accordingly, users access a single version of the electronic record 108 that is updated repeatedly. In an alternative embodiment, the invention can be implemented locally, allowing for multiple versions of the electronic record to be saved and communicated among the users.

The system 100 will be discussed in more detail with reference to the exemplary methods illustrated in FIGS. 2-6.

Figure 2:
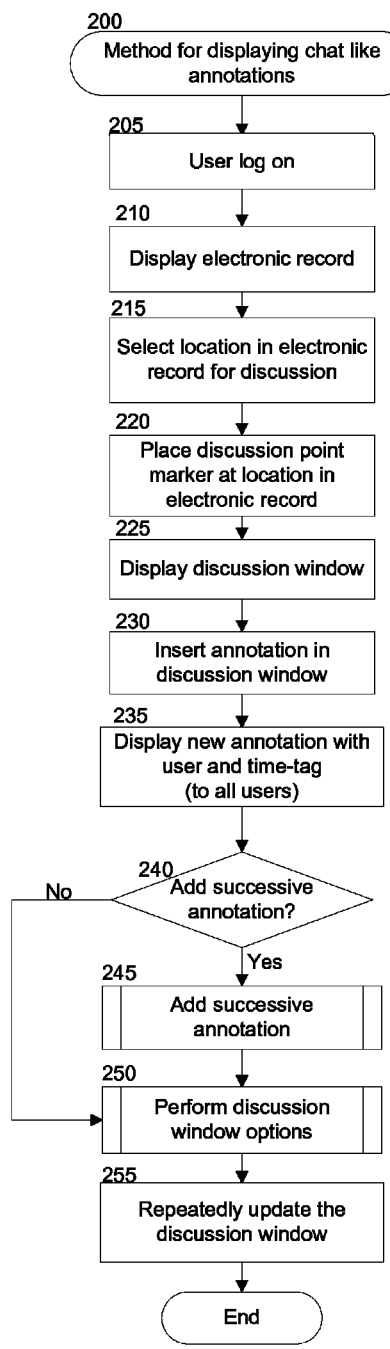
FIG. 2 is a flow chart depicting a method for displaying chat-like annotations, according to one exemplary embodiment.

FIG. 2 is a flow chart depicting a method 200 for displaying chat-like annotations, according to one exemplary embodiment. The exemplary method 200 is illustrative and, in alternative embodiments of the invention, certain stages can be performed in a different order, in parallel with one another, or omitted entirely, and/or certain additional stages can be performed without departing from the scope and spirit of the invention. The method 200 will be described with reference to FIGS. 1-6.

In stage 205, a user logs on to the workstation 102. The workstation 102 communicates with the server 106 to validate the user's log on information. Based on the valid log in of the user, the user can access the electronic record 108 on the server 106.

In stage 210, the interface 114 displays the electronic record 108. The electronic record 108 can be a file or record of any type, for example, a document created by word processing software, presentation software, and/or spreadsheet software. In addition, the electronic record 108 can be another type of record, such as a digital photograph, a video, and an audio file; and can include electronic records involving two-dimensional space or a higher-dimensional space.

In stage 215, the user selects a location in the electronic record to place a discussion point. The selected location can be anywhere in the electronic record 108, including the margins, and pertain to any content. For example, the selected content can include a certain paragraph in an electronic record 108 that is a word-processing type file. As another example, the selected location can be a particular artistic element in a digital photograph.

In stage 220, the user places the discussion point marker at the selected location in the electronic record 108. The user has multiple options to place the discussion point marker at the selected location. For example, the user can select the discussion point icon, displayed on the user interface 114 in a toolbar, and place it alongside the selected content within the electronic record 108 using the mouse 122. In addition, the user can highlight contents in the electronic record 108, for example, text, and right-click on the computer mouse 122. Right-clicking on a mouse 122 while the mouse cursor is over the selected location can enable options that include the option to add a discussion point. As another example, the user can highlight contents of the electronic record 108 and then click on a ghosted icon along the right side margin of the electronic record. Further, the user can simply click the ghosted icon along the right side margin of the document.

In stage 225, the interface 114 displays the discussion window within the electronic record 108. In one exemplary embodiment, the discussion window is automatically displayed when a discussion point is placed, as in stage 220. The discussion window is a section of the display used for displaying annotations, and resembles a chat like box. Representative discussion windows will be described in more detail herein below with reference to FIGS. 7-11.

In stage 230, the user adds an annotation in the discussion window displayed in stage 225. The user types the annotation by using the keyboard 120. When the user enters the annotation, by, for example, striking "Enter" on the keyboard 120, the workstation 102 communicates with the server 106. The server 106 stores the annotation entered in the electronic record 108. In an alternative embodiment, the server 106 stores the annotation in a separate annotation file 110. The annotation file 110 is a file capable of communication with the electronic record 108, and allows for storage of the annotation. Thus, in this alternative embodiment, the electronic record 108 need not store the annotations.

In stage 235, the interface 114 displays the new annotation to all users. The annotation is displayed with the user identification of the user who inserted the annotation, and a time-stamp, also known as a time-tag, indicating the time the annotation was added. Other users currently accessing the electronic record 108 can view the electronic record 108 containing the annotation entered in stage 235. The display for all users is updated on a repeated basis, as will be described in more detail herein below with reference to stage 255.

In stage 240, a user determination is made whether to add a successive annotation to the discussion created in stages 215 to 230. For example, a user who created the discussion point may wish to add another annotation, and/or a different user may wish to comment on the first user's annotation.

If, in stage 240, the determination is made to add a successive annotation, the method proceeds to stage 245. If, in stage 240, the determination is made not to add a successive annotation, the method proceeds to stage 250, as described in detail herein below.

In stage 245, a user adds a successive annotation to the discussion window. A successive annotation is an annotation added after the initial discussion point is created. Stage 245 is described in more detail herein with reference to FIG. 3.

In stage 250, the annotation engine 112 performs discussion window options based on user input. For example, discussion window options include modifying the content and/or location of the discussion window. Stage 250 will be described in more detail herein with reference to FIG. 4.

In stage 255, the server 106 repeatedly updates the electronic record 108 and the annotation file 110 to reflect changes in discussion points and their content. This refreshing on a regular, periodic basis is referred to herein as the "heartbeat" of the electronic record 108. In an exemplary embodiment, the "heartbeat" occurs every five (5) seconds. Accordingly, a user viewing the electronic record 108 can view current annotations. Thus, multiple users can view and annotate the same electronic record 108 at the same, or different times, and access the most current version of the electronic record 108.

Figure 3:
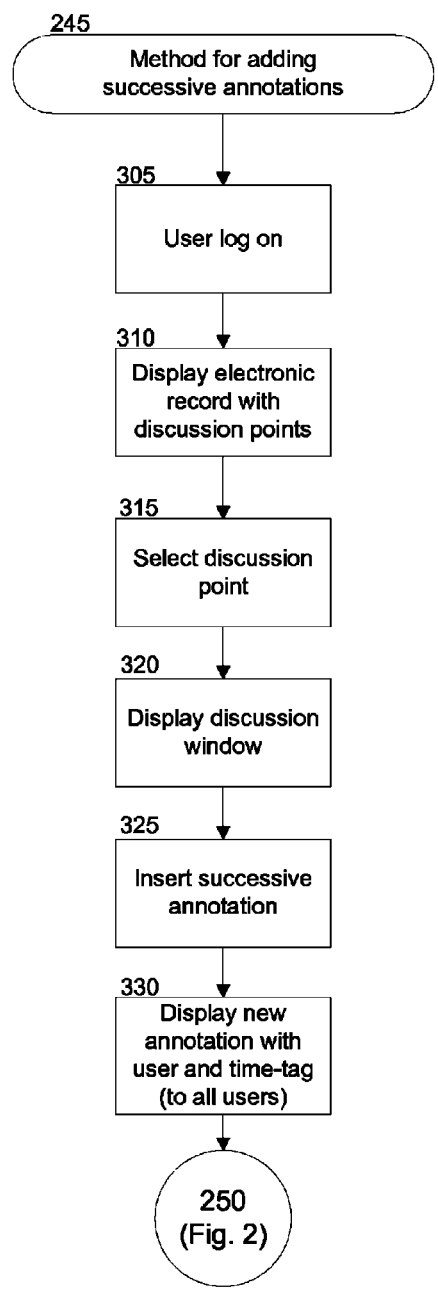
FIG. 3 is a flow chart depicting a method for adding successive annotations, according to one exemplary embodiment.

FIG. 3 is a flow chart depicting a method 245 for adding successive annotations, according to one exemplary embodiment. The exemplary method 245 is illustrative and, in alternative embodiments of the invention, certain stages can be performed in a different order, in parallel with one another, or omitted entirely, and/or certain additional stages can be performed without departing from the scope and spirit of the invention. The method 245 is described herein below with reference to FIGS. 1, 2, and 3.

In stage 305, a user logs on to the workstation 102, as described herein with reference to stage 205 of FIG. 2.

In stage 310, the user interface 114 displays the electronic record 108 with discussion points and/or discussion windows. The discussion points can be displayed in various ways, making the display of the electronic record 108 uncluttered and the discussion points easy to identify. In one exemplary embodiment, the discussion window can be displayed in various styles.

For example, the discussion window can be in the right margin of the electronic record 108, aligned vertically with the selected content. In this example, the discussion point (icon) is located adjacent to the content with which the discussion is associated.

As another example, the discussion point and the discussion window can be placed in-line with the selected content, i.e. if the electronic record 108 is a word processing file, the discussion point would be in the line below the selected content.

As yet another example, the discussion window can be displayed only when the cursor of the mouse 122, associated with the workstation 102, rolls over the content associated with the discussion and/or the discussion point. In this example, the discussion window is not constantly displayed, but the presence of a discussion is indicated to the user. This style may be most useful in an electronic record 108 that does not have traditional margins, such as a photograph. In this example, when the user "mouses" over the discussion point or content, an indication of the discussion can pop up in a window, and/or the entire discussion window can pop up in a window.

As yet another example, the discussion window can be displayed in a chat "bubble" at the location of the discussion point. The chat bubble is similar to a chat bubble and would be displayed on top of the underlying content of the electronic record.

In the style examples described above, the discussion window can be "collapsible," so as to only display a header indicating certain information related to the discussion, but not the actual annotations. For example, the header can include the user initiating the discussion, the number of successive annotations, and a date associated with the discussion. Further, the discussion window can expand to a predetermined height, with scrolling capability. In this way, a user can view all annotations in a discussion window that occupies a limited amount of space within the display of the electronic record 114, while still allowing the user to read each annotation and add successive annotations. Further, the discussion window can be displayed as partially transparent, or in a "ghosted over" format. This additionally provides for a less distracting display. When the user mouses over, or clicks on the discussion window, the discussion window can become non-transparent and solid, allowing the user to read the annotations and perform other options. Representative examples of the various styles of the discussion point and discussion window will be described herein below with reference to FIGS. 7-11.

In stage 315, the user selects the discussion point to which the user will add a successive annotation. The user selects the discussion point by, for example, clicking on the discussion point.

In stage 320, the user interface 114 displays the discussion window associated with the selected discussion point. Upon selection, the annotation engine 112 will activate the discussion window to accept new annotations, much like the display of a chat window.

In stage 325, the user inserts a successive annotation. The stage of adding a successive annotation is the same as the stage of inserting an annotation, as described herein with reference to stage 230 of FIG. 2.

In stage 330, the interface 114 displays the new successive annotation for all users. The annotation is displayed with the user identification of the user who inserted the successive annotation, and a time-stamp indicating the time the annotation was added. The successive annotation is displayed in a threaded format with the previous annotations in the discussion window. The method proceeds to stage 250 of FIG. 2. Stage 250 of FIG. 2 is described in more detail herein below with reference to FIG. 4.

Figure 4:
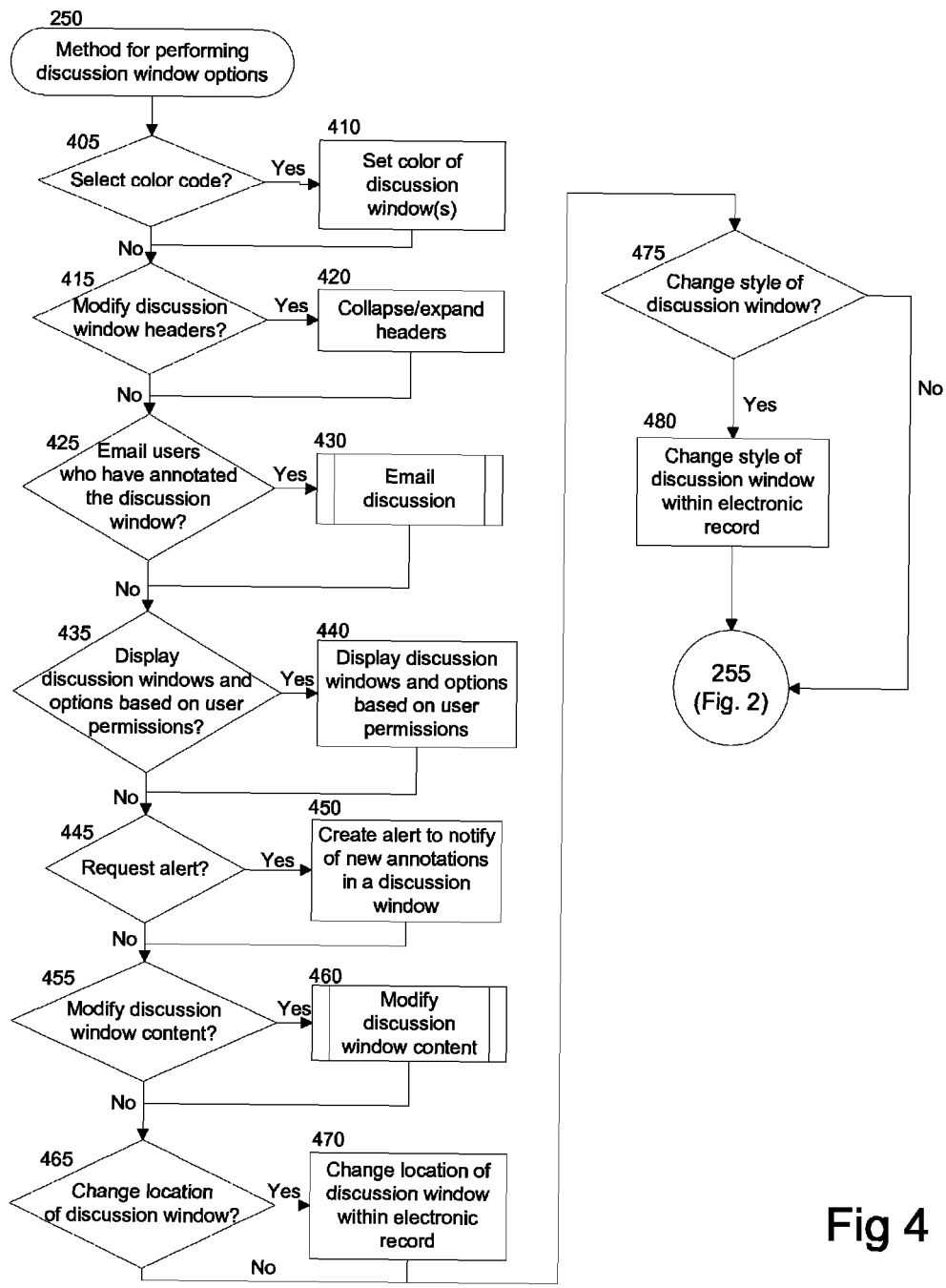
FIG. 4 is a flow chart depicting a method for performing discussion window options, according to one exemplary embodiment

FIG. 4 is a flow chart depicting a method 250 for performing discussion window options, according to one exemplary embodiment. The exemplary method 250 is illustrative and, in alternative embodiments of the invention, certain stages can be performed in a different order, in parallel with one another, or omitted entirely, and/or certain additional stages can be performed without departing from the scope and spirit of the invention. The exemplary method 250 is described herein below with reference to FIGS. 1, 4, and 5.

In stage 405, a user makes a determination whether to select a color code. A color code is a selection of a single color for each discussion window. Thus, discussion windows may be set to particular colors to distinguish them, while colors within discussions may be kept monochromatic to permit advantageous visual screen organization and viewing.

If, in stage 405, the determination is made to select a color code, the method proceeds to stage 410. If, in stage 405, the determination is made not to select a color code, the method proceeds to stage 415, as described herein below.

In stage 410, the annotation engine 112 sets the color code of a discussion window, based on input by the user. For example, the user can right-click on the discussion window to display a menu of options, including an option to select a color. The user can select a color option to reflect the category, importance, or other characteristic of the discussion window. For example, critical discussions can be set to the color "red," and/or discussions pertaining to a particular department, such as legal, can be set to a particular color, such as "blue."

In stage 415, the user determines whether to modify the discussion window headers. "Headers" are used herein to describe the user identification and time-stamp related to a discussion window. Modifying includes collapsing or expanding the discussion window to display the content of the discussion window, or only the header. This option allows for space-saving when displaying the electronic record 108 and for more streamlined viewing, as a user, for example, can expand only the discussion window headers for discussions pertaining to that user.

If, in stage 415, the determination is made to modify discussion window headers, the method proceeds to stage 420. If, in stage 415, the determination is made not to modify the discussion window headers, the method proceeds to stage 425, as described herein below.

In stage 420, the annotation engine 112 collapses and/or expands the discussion window headers, based on input by the user. For example, the user can right-click on the discussion window to display a menu of options, including the option to either collapse or expand the discussion window headers. In this way, the user can quickly identify and collapse discussions that are not of interest to the user, and expand for reviewing and adding annotations those discussion windows which are of importance to the user. This feature, as well as the color coding option described herein with reference to stage 405 and 410, allows for efficient and customized viewing of annotations, thus facilitating collaboration.

In stage 425, the user determines whether to email users who have annotated the discussion window. This option allows a user to transfer the discussion to an electronic mail application, thereby generating an email message to other users containing content from the discussion window.

If, in stage 425, the determination is made to email users who have annotated the discussion window, the method proceeds to stage 430. If, in stage 425, the determination is made not to email users who have annotated the discussion window, the method proceeds to stage 435, as described herein below.

In stage 430, the user emails the discussion. Stage 430 will be described in more detail herein below with reference to FIG. 5.

In stage 435, the annotation engine 112 determines whether to display discussion windows based on user permissions. Permission type settings can determine whether certain users can view others' annotations or only their own; and/or whether they can add annotations, based on the user's log in. In an exemplary embodiment, an administrator would configure the permission-type settings, for example, by associating a user log on identification with a particular permission level. When the user logs on to the workstation 102, the workstation 102 communicates with the server 106 and annotation engine 112 to determine the permission level of the user, based on the user log on.

If, in stage 435, the determination is made to display discussion windows and options based on user permissions, the method proceeds to stage 440. If, in stage 435, the determination is made to not display discussion windows and options based on user permissions, the method proceeds to stage 445, as described herein below.

In stage 440, the discussion windows and options are displayed according to user permissions. Accordingly, a user may only be able to view his or her own annotations in discussion windows, and another user may be able to view all annotations. Alternatively, certain users may not be able to add annotations to discussion windows based on their user log on and associated permission level. This feature can allow for unbiased feedback by not displaying certain annotations, and for developing insightful discussions.

In stage 445, the user determines whether to request an alert. An alert is a notification to the requesting user that a new annotation has been added to a particular discussion window. The notification can take place via email, instant messaging, or another means of electronic communication, such as text messaging.

If, in stage 445, the determination is made to request an alert, the method proceeds to stage 450. If, in stage 445, the determination is made not to request an alert, the method proceeds to stage 455, as described herein below.

In stage 450, the annotation engine 112 creates an alert to notify of new annotations in a discussion window, based on input by the user. For example, the user can right-click on the discussion window to display a menu of options, including the option to request an alert. When a successive annotation is added to the selected discussion window, the requesting user will receive the alert.

In stage 455, the user determines whether to modify discussion window content. Modification of discussion window content includes deleting an annotation and/or discussion window, hiding an annotation and/or discussion window, editing an annotation, and changing a user associated with an annotation.

If, in stage 455, the determination is made to modify discussion window content, the method proceeds to stage 460. If, in stage 455, the determination is made not to modify discussion window content, the method proceeds to stage 465, as described herein below.

In stage 460, the user makes selections to modify the discussion window content. Stage 460 will be described in more detail herein with reference to FIG. 6.

In stage 465, the user determines whether to change the location of the discussion window. For example, the user can move the discussion window to a different location in the electronic record 108.

If, in stage 465, the determination is made to change the location of the discussion window within the electronic record 108, the method proceeds to stage 470. If, in stage 465, the determination is made not to change the location of the discussion window, the method proceeds to stage 475, as described herein below.

In stage 470, the annotation engine 112 changes the location of the discussion window within the electronic record 108, based on user input. For example, the user can use the mouse 122 to grab and drag the discussion point to a new location in the electronic record 108.

In stage 475, the user determines whether to change the style of the discussion window. The various styles of the discussion window were described herein above with reference to stage 310 of FIG. 3. For example, the discussion window can be displayed as a ghosted icon, in-line with the content of the electronic record, and/or in a margin of the electronic record.

If, in stage 475, the determination is made to change the style of the discussion window, the method proceeds to stage 480. If, in stage 475, the determination is made not to change the style of the discussion window, the method proceeds to stage 255 of FIG. 2, which was described in more detail herein above with reference to FIG. 2.

In stage 480, the annotation engine 112 changes the style of the discussion window, based on user input. For example, the user can make a selection to display all discussion windows in the margins, instead of in-line with text of a document. The method then proceeds to stage 255 of FIG. 2.

Figure 5:
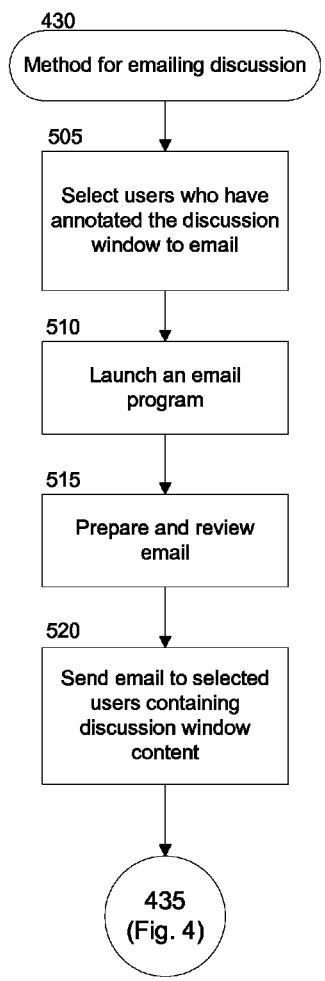
FIG. 5 is a flow chart depicting a method for emailing a discussion, according to one exemplary embodiment.

FIG. 5 is a flow chart depicting a method 430 for emailing a discussion, according to one exemplary embodiment. The exemplary method 430 is illustrative and, in alternative embodiments of the invention, certain stages can be performed in a different order, in parallel with one another, or omitted entirely, and/or certain additional stages can be performed without departing from the scope and spirit of the invention. The method 430 will be described in more detail herein with reference to FIGS. 1, 4, and 5.

In stage 505, the user selects users who have annotated the discussion window to email. For example, the user may select all users who have annotated in the discussion window, or only a subset of the users, depending on the type of discussion the user wishes to take into an email discussion. The user can select the users by choosing a menu option, displayed by right-clicking on the particular discussion window.

In stage 510, the server 106 launches an email program. For example, the email program can include gmail, or an internet browser capable of supporting email programs.

In stage 515, the user can prepare and review the email, by adding additional content to the email as appropriate, in addition to the content of the discussion window. The user can, for example, explain the reason for the email.

In stage 520, the email program launched in stage 510 sends the email to the selected users, containing the discussion window content and any additional content added by the emailing user in stage 515. The method then proceeds to stage 435, as described herein with reference to FIG. 4.

Figure 6:
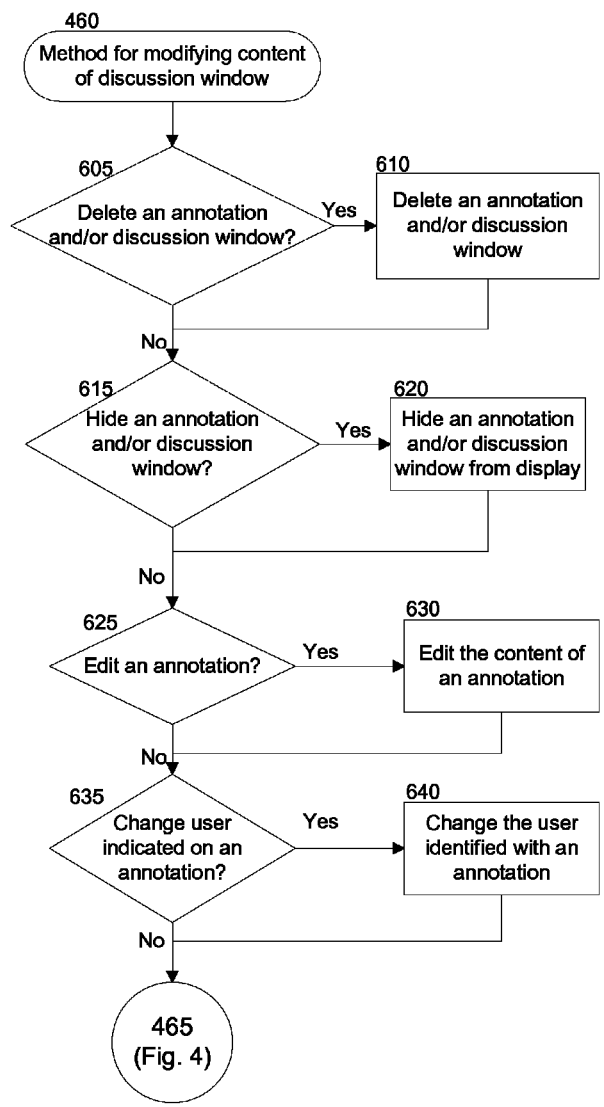
FIG. 6 is a flow chart depicting a method for modifying discussion window content, according to one exemplary embodiment.

FIG. 6 is a flow chart depicting a method 460 for modifying discussion window content, according to one exemplary embodiment. The exemplary method 460 is illustrative and, in alternative embodiments of the invention, certain stages can be performed in a different order, in parallel with one another, or omitted entirely, and/or certain additional stages can be performed without departing from the scope and spirit of the invention. The method 460 will be described in more detail herein with reference to FIGS. 1 and 6.

In stage 605, a determination is made whether to delete an annotation and/or a discussion window. For example, an annotation may no longer be relevant following a change in the electronic record, and the user may wish to delete an annotation.

If, in stage 605, the determination is made to delete an annotation and/or discussion window, the method proceeds to stage 610. If, in stage 605, the determination is made not to delete an annotation and/or discussion window, the method proceeds to stage 615, as described herein below.

In stage 610, the annotation engine 112 deletes the annotation and/or discussion window, based on input received by the user. A deleted annotation and/or discussion window is no longer viewable or capable of being displayed in the discussion window. In one exemplary embodiment, users can only delete their own annotations and/or discussion windows which they have initiated. Alternatively, users can delete annotations and/or discussion windows of others, based on user permissions, as described herein with reference to stages 435 and 440 of FIG. 4.

In stage 615, the user determines whether to hide an annotation and/or discussion window. A hidden annotation and/or discussion window is not displayed temporarily. However, when annotations and/or discussion windows are hidden, notifications may surface to let the user know of recent activity.

If, in stage 615, the determination is made to hide an annotation and/or discussion window, the method proceeds to stage 620. If, in stage 615, the determination is made not to hide an annotation and/or discussion window, the method proceeds to stage 625, as described herein below.

In stage 620, the annotation engine 112 hides the annotation and/or discussion window, based on input received by the user. Unlike deletion, the hidden annotation and/or discussion window may later be displayed, but is temporarily hidden from view.

In stage 625, a determination is made whether to edit an annotation. A user can edit the content of his or her own annotations. In addition, a user can edit the content of another user's annotations, depending on user permissions, as described herein with reference to stages 435 and 440 of FIG. 4.

If, in stage 625, the determination is made to edit an annotation, the method proceeds to stage 630. If, in stage 625, the determination is made not to edit an annotation, the method proceeds to stage 635, as described in more detail herein below.

In stage 630, the annotation engine 112 enables the user to edit the content of the annotation, using the workstation 102. For example, the user can correct misspellings and modify the content of an annotation.

In stage 635, the user determines whether to change the user indicated on an annotation, as each annotation indicates the user making the annotation. For example, the user may wish to remain anonymous, and/or change the identified user to indicate the department they represent, rather then their individual name.

If, in stage 635, the determination is made to change the user identified with an annotation, the method proceeds to stage 640. If, in stage 635, the determination is made not to change the user identified with an annotation, the method proceeds to stage 645, as described herein below.

In stage 640, the annotation engine 112 changes the user identified with an annotation, based on user input. The method proceeds to stage 465 of FIG. 4, as described previously herein.

FIG. 7 is a representative screenshot 700 of discussion windows in the margin of an electronic record, according to one exemplary embodiment. As shown in FIG. 7, the each discussion window is monochromatic and aligned with content of the electronic record with which it is associated. Discussion points (icons) in the electronic record indicate to a user where in the document the discussions are taking place. The simplicity of the style provides for an uncluttered display of the electronic record.

Figure 8:
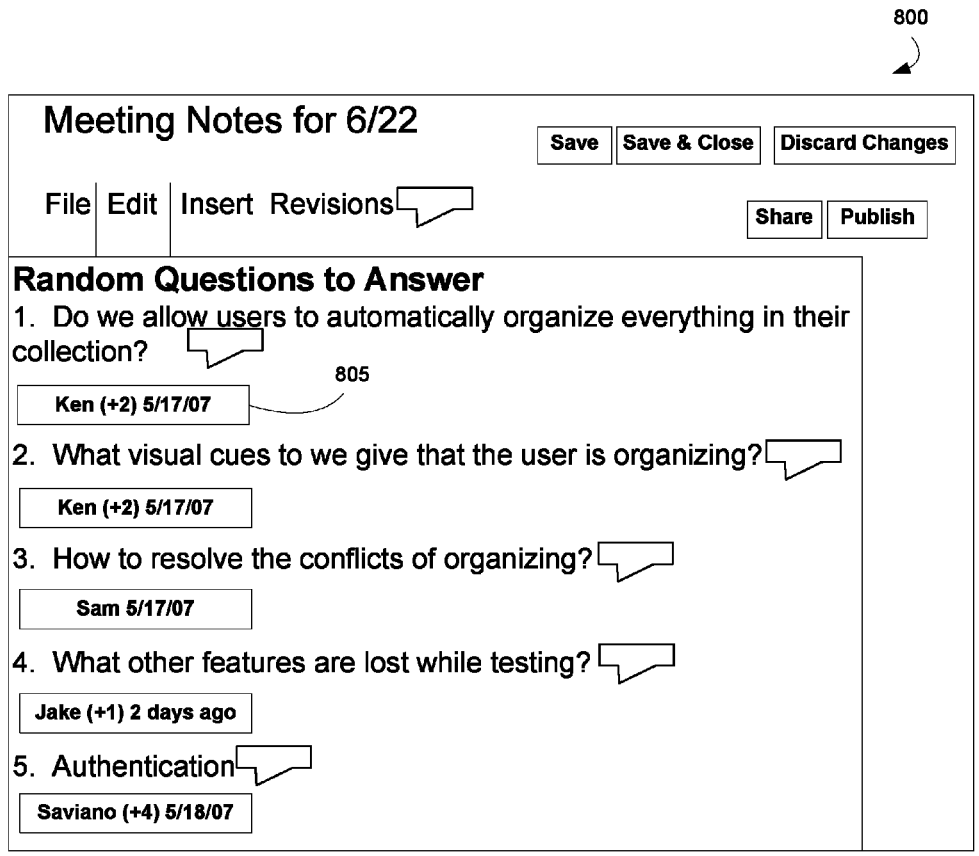
FIG. 8 is a representative screenshot of discussion windows in-line with text of an electronic record, according to one exemplary embodiment.

FIG. 8 is a representative screenshot 800 of discussion windows in-line with text of an electronic record, according to one exemplary embodiment. As shown in FIG. 8, the discussion windows are in "collapsed" form. In the collapsed form, only a header is visible, showing the user who initiated the discussion window, and the number of successive annotations. For example, the discussion window 805 is shown in collapsed form, which displays that the user "Ken" had initiated the discussion on May 17, 2007, and there have been two successive annotations.

Figure 9:
FIG. 9 is a representative screenshot of discussion windows in-line with text of an electronic record and expanded, according to one exemplary embodiment.

FIG. 9 is a representative screenshot 900 of discussion windows in-line with text of an electronic record and expanded, according to one exemplary embodiment. As shown in FIG. 9, the discussion window 805 is in expanded form, displaying the successive annotations described herein with reference to FIG. 8. In addition, the expanded discussion window has scrolling capability within the discussion window 805 of a fixed height, as shown by the scrolling mechanism 905.

Figure 10:
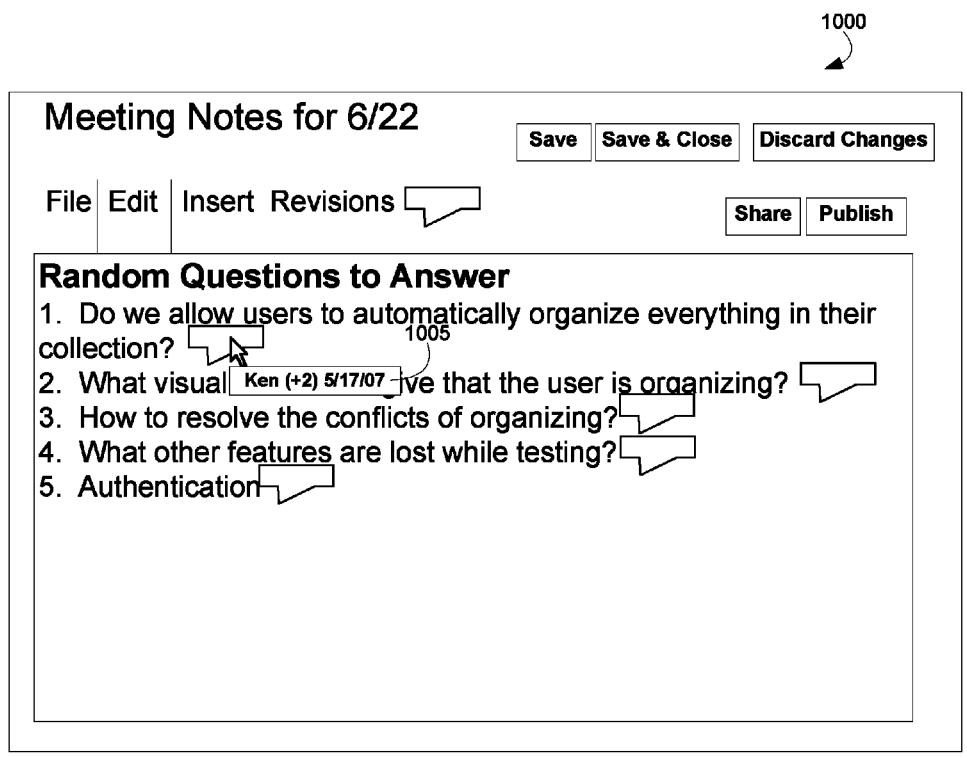
FIG. 10 is a representative screenshot of a moused-over discussion point in an electronic record, according to one exemplary embodiment.

FIG. 10 is a representative screenshot 1000 of a moused-over discussion point in an electronic record, according to one exemplary embodiment. The discussion points indicate to a user where discussions are taking place in the document. When a user moves the cursor of the mouse 122 over the discussion point, a small indicator 1005 appears, indicating the user who initiated the discussion, the number of successive annotations, and the date.

Figure 11:
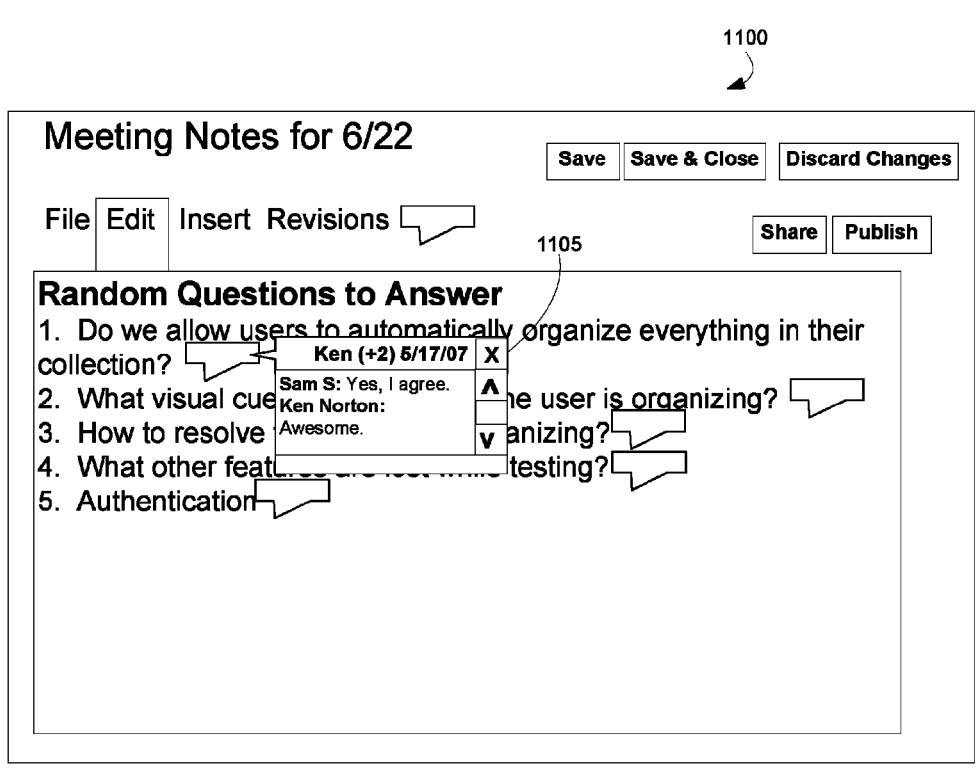
FIG. 11 is a representative screenshot of a discussion window in a chat bubble in an electronic record, according to one exemplary embodiment.

FIG. 11 is a representative screenshot 1100 of a discussion window in a chat bubble in an electronic record, according to one exemplary embodiment. As shown in FIG. 11, the discussion window appears as a chat bubble 1105 at the same location as the discussion point.

Although specific embodiments of the invention have been described above in detail, the description is merely for purposes of illustration. Various modifications of, and equivalent stages corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

We claim:

1. A method comprising the steps of:
   accessing an annotation engine resident on a web server, the annotation engine configured to generate a user interface for display to a plurality of users;
   accessing, via the annotation engine, an electronic record stored on the web server;

receiving an indication of a portion of the electronic record corresponding to an annotation;

generating, via the annotation engine, a discussion window at a location in the electronic record proximate to the indicated portion;

receiving the annotation, the annotation input by one of the plurality of users;

updating, via the annotation engine, the discussion window to display a plurality of successive annotations input by one of the plurality of users, each of the plurality of successive annotations time-tagged by the annotation engine relative to its time of input by a respective one of the plurality of users, each of the plurality of successive annotations corresponding to the annotation;

associating, via the annotation engine, the electronic record with the plurality of successive annotations and storing the plurality of successive annotations in the electronic record on the web server upon receipt of each of the plurality of successive annotations;

customizing the discussion window based on a determination made by one of the plurality of users; and customizing the discussion window by assigning a color code to the discussion window, wherein the assigning of the color code is based on at least one of: a categorization of the discussion window; importance of the discussion window; and a characteristic of the discussion window.

2. The method according to claim 1, further comprising the step of generating an email in response to a user request.

3. The method according to claim 2, wherein the email comprises the plurality of successive annotations associated with the discussion window, selected in accordance with the user request.

4. The method according to claim 2, wherein an email program sends the email to a respective plurality of users who have input the plurality of successive annotations.

5. The method according to claim 1, further comprising the step of generating an alert in response to an input of one of the plurality of successive annotations.

6. The method according to claim 5, wherein the alert is generated in response to a user request.

7. The method according to claim 1, wherein customizing the discussion window comprises at least one of: changing the location of the discussion window; changing a style of the discussion window; collapsing the discussion window; and expanding the discussion window.

8. The method according to claim 1, wherein the step of customizing the discussion window comprises at least one of:
changing the location of the discussion window;
changing a style of the discussion window corresponding to a display of the discussion window in at least one of: a margin of the electronic record; in-line with the indicated portion of the electronic record; a chat bubble; and the discussion window displayed in response to placing a pointer proximate to an icon;
collapsing the discussion window; and
expanding the discussion window.

9. The method according to claim 1, further comprising the step of modifying the content of the discussion window.

10. The method according to claim 9, wherein the step of modifying the content of the discussion window comprises at least one of: deleting least one of the plurality of successive annotations; hiding at least one of the plurality of successive annotations; editing at least one of the plurality of successive annotations; deleting the discussion window; and hiding the discussion window.

11. The method according to claim 1, further comprising displaying the discussion window based on a permission level of each of the plurality of users.

12. The method according to claim 11, wherein the permission level of each of the plurality of users is based on a user log on identification.

13. The method according to claim 1, wherein the step of updating the discussion window to display the plurality of successive annotations occurs on an event-driven basis, wherein an event comprises at least one of: customizing the discussion window; modifying the content of the discussion window; and adding one of the plurality of successive annotations to the discussion window.

14. The method according to claim 1, wherein the discussion window has a fixed height and provides scrolling capability.

15. The method according to claim 1, wherein the step of generating a discussion window at the location in the electronic record proximate to the indicated portion further comprises receiving an indication of a discussion point icon at the location in the electronic record proximate to the indicated portion.

16. The method according to claim 1, wherein the plurality of successive annotations comprise text.

17. A system for annotating electronic records based on input of a plurality of users, the system comprising:
a processor;
one or more processing units for accessing an annotation engine resident on a web server;
an interface for receiving input from the plurality of users, the interface in communication with the annotation engine; and
the annotation engine executable by the web server, the annotation engine comprising:
instructions for accessing an electronic record resident on the web server and displaying the electronic record via the interface;
instructions for receiving the input from the plurality of users, comprising: an indication of a portion of the electronic record corresponding to an annotation input by one of the plurality of users, an indication of a location for a discussion window in the electronic record, and a plurality of successive annotations for insertion into the discussion window, each of the plurality of successive annotations corresponding to the annotation;
instructions for displaying the discussion window at the location in the electronic record;
instructions for time-tagging and entering into the discussion window the plurality of successive annotations;
instructions for updating the discussion window to display the plurality of successive annotations,
instructions for associating the electronic record with the plurality of successive annotations and storing the plurality of successive annotations with the electronic record on the web server upon receipt of each of the plurality of successive annotations;
instructions for customizing the discussion window based on a determination made by one of the plurality of users; and
instructions for customizing the discussion window by assigning a color code to the discussion window, wherein the assigning of the color code is based on at least one of: a categorization of the discussion window; importance of the discussion window; and a characteristic of the discussion window.

18. The system according to claim 17, wherein the annotation engine further comprises instructions for emailing the plurality of successive annotations to the plurality of users.

19. The system according to claim 17, wherein the annotation engine further comprises instructions for displaying, on the interface, the discussion window at the location in the electronic record.

20. The system according to claim 17, wherein the annotation engine further comprises instructions for alerting the plurality of users when at least one of the plurality of successive annotations is displayed in the discussion window, the alert comprising at least one of an email, an instant message, a text message, and an other type of electronic notification.

21. The system according to claim 17, wherein the annotation engine further comprises instructions for receiving an other input from the one or more users comprising at least one of: i) a modification of a content of the discussion window; ii) a modification of a style of the discussion window; and iii) a modification of the location of the discussion window.

22. The system according to claim 21, wherein the modification of the content of the discussion window comprises at least one of: deleting at least one of the plurality of successive annotations, hiding at least one of the plurality of successive annotations, editing at least one of the plurality of successive annotations, changing a user associated with at least one of the plurality of successive annotations, deleting the discussion window, and hiding the discussion window.

23. The system according to claim 21, wherein the modification of the style of the discussion window comprises at least one of: collapsing the discussion window; expanding the discussion window; displaying the discussion window in a margin; displaying the discussion window in-line with the indicated portion of the electronic record; displaying the discussion window as a chat bubble at the location; and displaying an icon indicating the location of the discussion window.

24. The system according to claim 23, wherein collapsing the discussion window comprises displaying a header of the discussion window,
wherein expanding the discussion window comprises displaying the discussion window with a fixed height and scrolling capability.

25. The system according to claim 17, wherein the annotation engine further comprises instructions to validate a log on of each of the plurality of users.

26. The system according to claim 25, wherein the annotation engine further comprises instructions to display the discussion window based on a permission level associated with a valid log on of each of the plurality of users.

27. A computer program product for use in conjunction with a computer system, the computer program product comprising a non-transitory computer readable storage medium and a computer program mechanism embedded therein, the computer program mechanism comprising:
instructions for generating a user interface at a web server for display at a local processing unit;
instructions for accessing an electronic record resident on the web server;
instructions for displaying at the user interface the electronic record;
instructions for receiving an indication of a portion of the electronic record corresponding to an annotation;
instructions for receiving position information from one of a plurality of users, the position information for displaying a discussion window at a location in the electronic record proximate to the indicated portion;
instructions for receiving a plurality of annotations input by the plurality of users, each of the plurality of annotations corresponding to the annotation;
instructions for successively displaying at the discussion window the plurality of annotations, the plurality of annotations time-tagged relative to its time of input by the plurality of users;
instructions for receiving instructions from at least one of the plurality of users for electronically communicating at least a subset of the plurality of annotations to an identified recipient;
instructions to display the discussion window in the electronic record;
instructions for customizing the discussion window based on a determination made by one of the plurality of users;
instructions for customizing the discussion window by assigning a color code to the discussion window, wherein the assigning of the color code is based on at least one of: a categorization of the discussion window; importance of the discussion window; and a characteristic of the discussion window;
upon receipt of the instructions for electronically communicating a subset of the plurality of annotations, instructions for launching an email program resident on the web server and sending to the email program a copy of the subset of the plurality of annotations, and
associating the electronic record with the plurality of annotations and storing the plurality of annotations in the electronic record on the web server upon receipt of each of the plurality of annotations.

28. The computer program product according to claim 27, further comprising instructions to update the discussion window on a repeated basis to reflect the plurality of annotations.

29. The computer program product according to claim 27, wherein a style and the location of the discussion window are modifiable based upon receipt of instructions from one of the plurality of users.

30. The computer program product according to claim 27, further comprising instructions to display the discussion window based on a permission level of each of the plurality of users.

31. The computer program product according to claim 30, wherein the permission level of each of the plurality of users is based on a user log on identification.

32. The computer program product according to claim 30, wherein the display of the discussion window that is based on a permission level of each of the plurality of users further causes the annotation engine to hide the discussion window.

33. The computer program product according to claim 30, wherein the display of the discussion window based on a permission level of each of the plurality of users further causes the annotation engine to disable a functionality of the discussion window.

* * * * *